United States Patent
Khan Beigi et al.

(10) Patent No.: US 12,218,728 B2
(45) Date of Patent: Feb. 4, 2025

(54) METHODS AND APPARATUSES FOR JOINT CSI MEASUREMENT IN NCJT

(71) Applicant: INTERDIGITAL PATENT HOLDINGS, INC., Wilmington, DE (US)

(72) Inventors: Nazli Khan Beigi, Longueuil (CA); Afshin Haghighat, Ile-Bizard (CA); Young Woo Kwak, Woodbury, NY (US); Moon Il Lee, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 13 days.

(21) Appl. No.: 18/272,002

(22) PCT Filed: Jan. 12, 2022

(86) PCT No.: PCT/US2022/012186
§ 371 (c)(1),
(2) Date: Jul. 12, 2023

(87) PCT Pub. No.: WO2022/155250
PCT Pub. Date: Jul. 21, 2022

(65) Prior Publication Data
US 2024/0072865 A1  Feb. 29, 2024

Related U.S. Application Data

(60) Provisional application No. 63/249,392, filed on Sep. 28, 2021, provisional application No. 63/136,513, filed on Jan. 12, 2021.

(51) Int. Cl.
*H04L 5/12* (2006.01)
*H04B 7/06* (2006.01)
*H04L 25/02* (2006.01)

(52) U.S. Cl.
CPC ......... *H04B 7/0626* (2013.01); *H04B 7/0617* (2013.01); *H04L 25/0228* (2013.01)

(58) Field of Classification Search
CPC .. H04B 7/0626; H04B 7/0617; H04L 25/0228
(Continued)

(56) References Cited

U.S. PATENT DOCUMENTS

2021/0328742 A1* 10/2021 Hao ................. H04L 5/0057

FOREIGN PATENT DOCUMENTS

WO  2018/229078  12/2018

OTHER PUBLICATIONS

"RAN1 Chairman's Notes," 3GPP TSG RAN WG1 Meeting #103-e, e-Meeting (Oct. 26-Nov. 13, 2020).
(Continued)

*Primary Examiner* — Zewdu A Kassa
(74) *Attorney, Agent, or Firm* — VOLPE KOENIG

(57) ABSTRACT

Methods and apparatuses for joint channel state information (CSI) measurement are described herein. A method may include receiving channel state information reference signals (CSI-RSs) from first and second transmit/receive points (TRPs), determining CSI, and selecting one of the TRPs as a primary TRP and a remaining one of the first TRP or the second TRP as a secondary TRP. The method may include reporting information indicating a first CSI for the primary TRP and receiving second CSI-RSs from the TRPs. The method may include determining a second CSI and a precoding matrix indicator (PMI) for the primary TRP, and determining channel coding information for the primary TRP. The method may include determining a second CSI for the secondary TRP, determining, based on channel coding information and the second CSI for the secondary TRP and a PMI for the secondary TRP, and reporting information indicating the PMI for the second TRP.

20 Claims, 10 Drawing Sheets

(58) Field of Classification Search
USPC .............. 375/362, 260, 259, 219, 295, 316
See application file for complete search history.

(56) References Cited

OTHER PUBLICATIONS

CMCC, "Enhancements on CSI reporting for Multi-TRP," 3GPP TSG RAN WG1 #103-e, R1-2008006, e-Meeting (Oct. 26-Nov. 13, 2020).

Ericsson, "CSI feedback for multi-TRP," 3GPP TSG-RAN WG1 #90, R1-1714286, Prague, Czech Republic (Aug. 21-25, 2017).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

Mediatek Inc., "CSI enhancement for NCJT," 3GPP TSG RAN WG1 #102-e, R1-2005623, e-Meeting (Aug. 17-28, 2020).

Samsung, "New WID: Further enhancements on MIMO for NR," 3GPP TSG RAN Meeting #86, RP-193133, Sitges, Spain (Dec. 9-12, 2019).

Third Generation Partnership Project, "Technical Specification Group Radio Access Network; NR; Physical layer procedures for control (Release 16)," 3GPP TS 38.213 V16.1.0 (Mar. 2020).

Third Generation Partnership Project, "Technical Specification Group Radio Access Network; NR; Physical layer procedures for control (Release 16)," 3GPP TS 38.213 V16.4.0 (Dec. 2020).

Third Generation Partnership Project, "Technical Specification Group Radio Access Network; NR; Physical layer procedures for control (Release 16)," 3GPP TS 38.213 V16.8.0 (Dec. 2021).

Third Generation Partnership Project, "Technical Specification Group Radio Access Network; NR; Physical layer procedures for control (Release 17)," 3GPP TS 38.213 V17.0.0 (Dec. 2021).

Third Generation Partnership Project, "Technical Specification Group Radio Access Network; NR; Physical layer procedures for data (Release 16)," 3GPP TS 38.214 V16.4.0 (Dec. 2020).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network; NR; Physical layer procedures for data (Release 16)," 3GPP TS 38.214 V16.8.0 (Dec. 2021).

Third Generation Partnership Project, "Technical Specification Group Radio Access Network; NR; Physical layer procedures for data (Release 17)," 3GPP TS 38.214 V17.0.0 (Dec. 2021).

Third Generation Partnership Project, "Technical Specification Group Radio Access Network; NR; Medium Access Control (MAC) protocol specification (Release 16)," 3GPP TS 38.321 V16.0.0 (Mar. 2020).

Third Generation Partnership Project, "Technical Specification Group Radio Access Network; NR; Medium Access Control (MAC) protocol specification (Release 16)," 3GPP TS 38.321 V16.3.0 (Dec. 2020).

Third Generation Partnership Project, "Technical Specification Group Radio Access Network; NR; Medium Access Control (MAC) protocol specification (Release 16)," 3GPP TS 38.321 V16.7.0 (Dec. 2021).

Third Generation Partnership Project, "Technical Specification Group Radio Access Network; NR; Radio Resource Control (RRC) protocol specification (Release 16)," 3GPP TS 38.331 V16.0.0 (Mar. 2020).

Third Generation Partnership Project, "Technical Specification Group Radio Access Network; NR; Radio Resource Control (RRC) protocol specification (Release 16)," 3GPP TS 38.331 V16.3.1 (Jan. 2021).

Third Generation Partnership Project, "Technical Specification Group Radio Access Network; NR; Radio Resource Control (RRC) protocol specification (Release 16)," 3GPP TS 38.331 V16.7.0 (Dec. 2021).

\* cited by examiner

METHODS AND APPARATUSES FOR JOINT CSI MEASUREMENT IN NCJT

CROSS-REFERENCE TO RELATED APPLICATIONS

This application is the U.S. National Stage, under 35 U.S.C. § 371, of International Application No. PCT/US2022/012186 filed Jan. 12, 2022, which claims the benefit of U.S. Provisional Application No. 63/136,513, filed Jan. 12, 2021, and U.S. Provisional Application No. 63/249,392, filed Sep. 28, 2021, the contents of which are incorporated herein by reference.

BACKGROUND

In Third Generation Partnership Project (3GPP) specifications for Multiple Input-Multiple Output (MIMO) in New Radio (NR), enhancements for CSI reporting for DL multi-transmit/receive point (TRP) and/or multi-panel transmission may enable more dynamic channel/interference hypotheses for Non-Coherent Joint Transmission (NCJT), targeting both Frequency Range 1 (FR1) and/or Frequency Range 2 (FR2). NCJT, as may be understood in the multi-TRP context, may refer to transmissions performed by cooperating TRPs without prior phase-mismatch correction and tight synchronization. In NCJT, a receiving device may combine the received transmissions non-coherently (i.e., without knowing the phase shift between channels).

Consistent with Release 16 specifications for multiple transmit receive point (M-TRP) scenarios, spatial division multiplexed (SDM) NCJT schemes may provide for different layers of the same codeword corresponding to different TRPs or panels, which may imply different Transmission Configuration Information (TCI) states. Precise measurement and reporting of Channel State Information (CSI) (including channel quality indicator (CQI), rank indicator (RI), precoding matrix indicator (PMI), etc.) for NCJT with a single reporting setting may be subject to efficient configuration and interpretation of the CSI resources for channel and interference measurements.

SUMMARY

Methods and apparatuses for joint channel state information (CSI) measurement are described herein. A method may include receiving channel state information reference signals (CSI-RSs) from first and second transmit/receive points (TRPs), determining CSI, and selecting one of the TRPs as a primary TRP and a remaining one of the first TRP or the second TRP as a secondary TRP. The method may include reporting information indicating a first CSI for the primary TRP and receiving second CSI-RSs from the TRPs. The method may include determining a second CSI and a precoding matrix indicator (PMI) for the primary TRP, and determining channel coding information for the primary TRP. The method may include determining a second CSI for the secondary TRP, determining, based on channel coding information and the second CSI for the secondary TRP and a PMI for the secondary TRP, and reporting information indicating the PMI for the second TRP.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
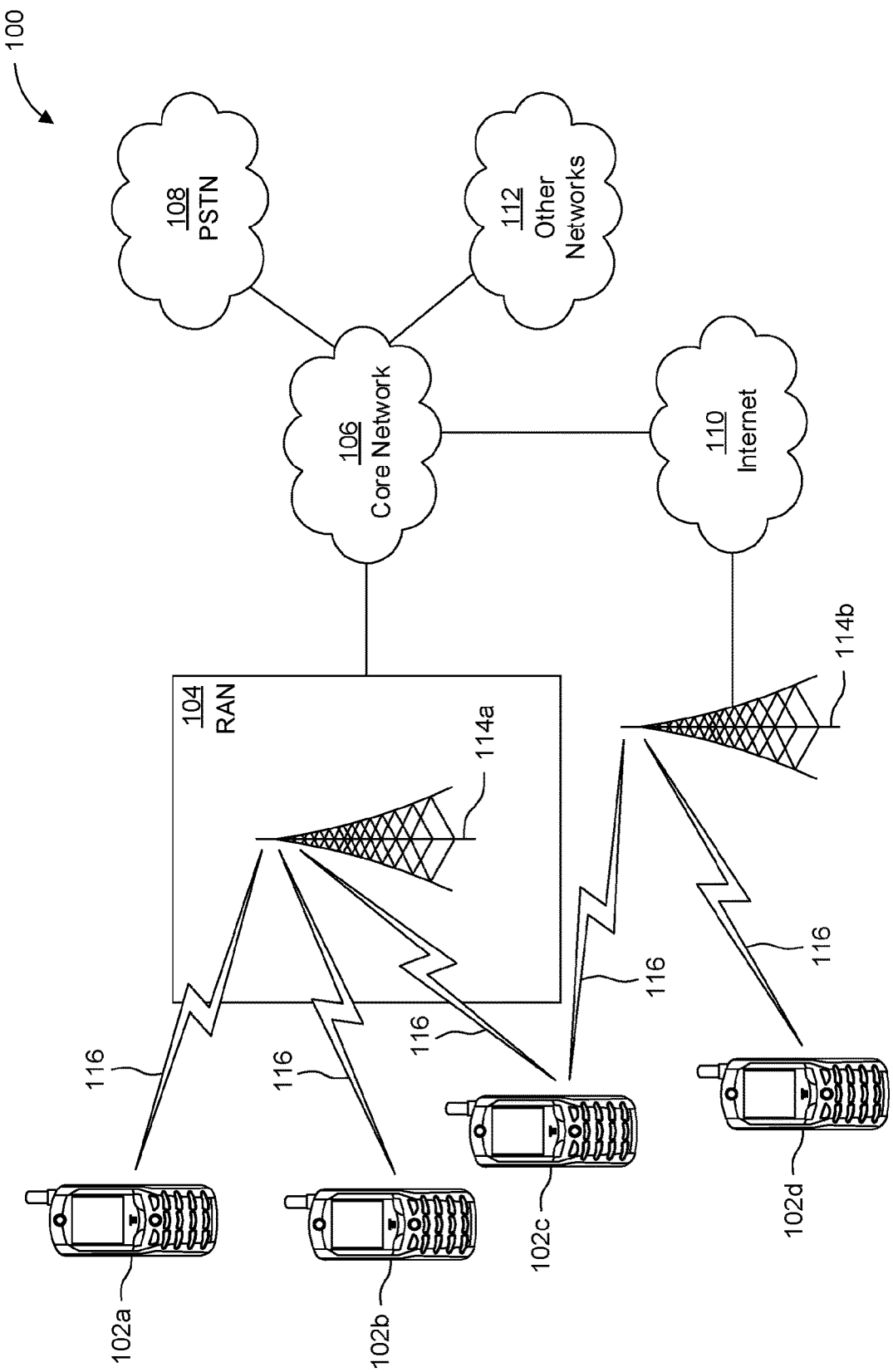
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
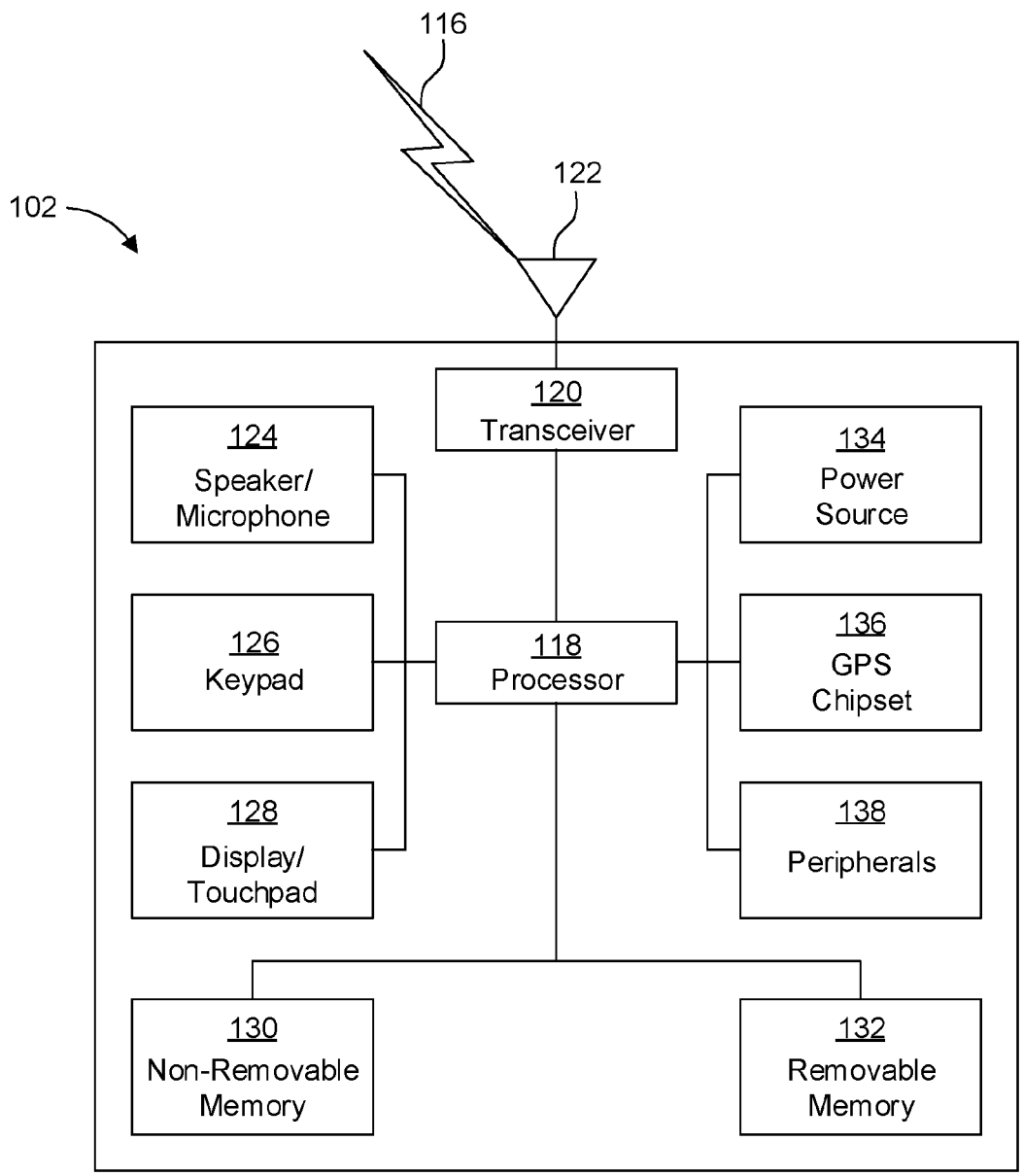
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
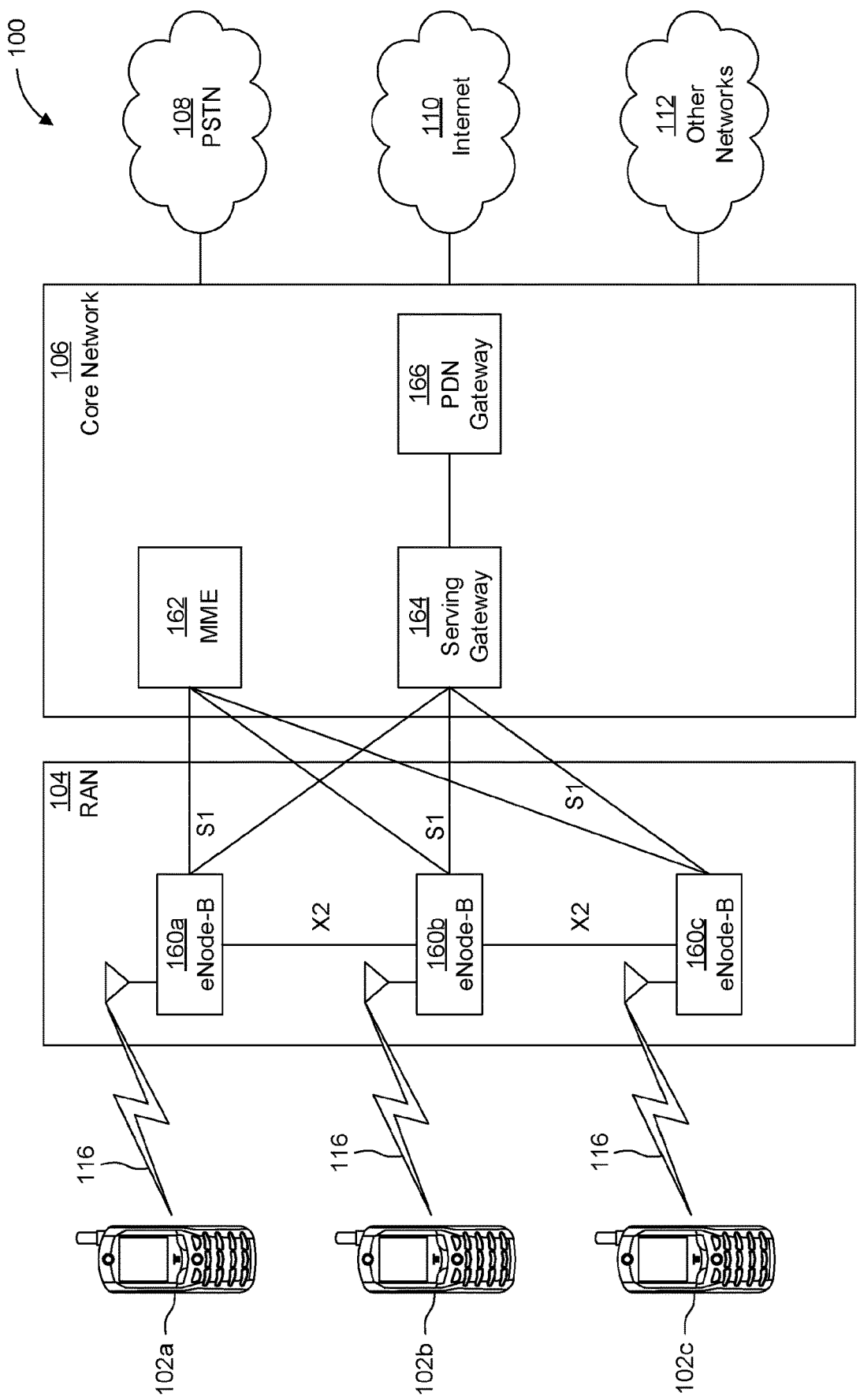
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
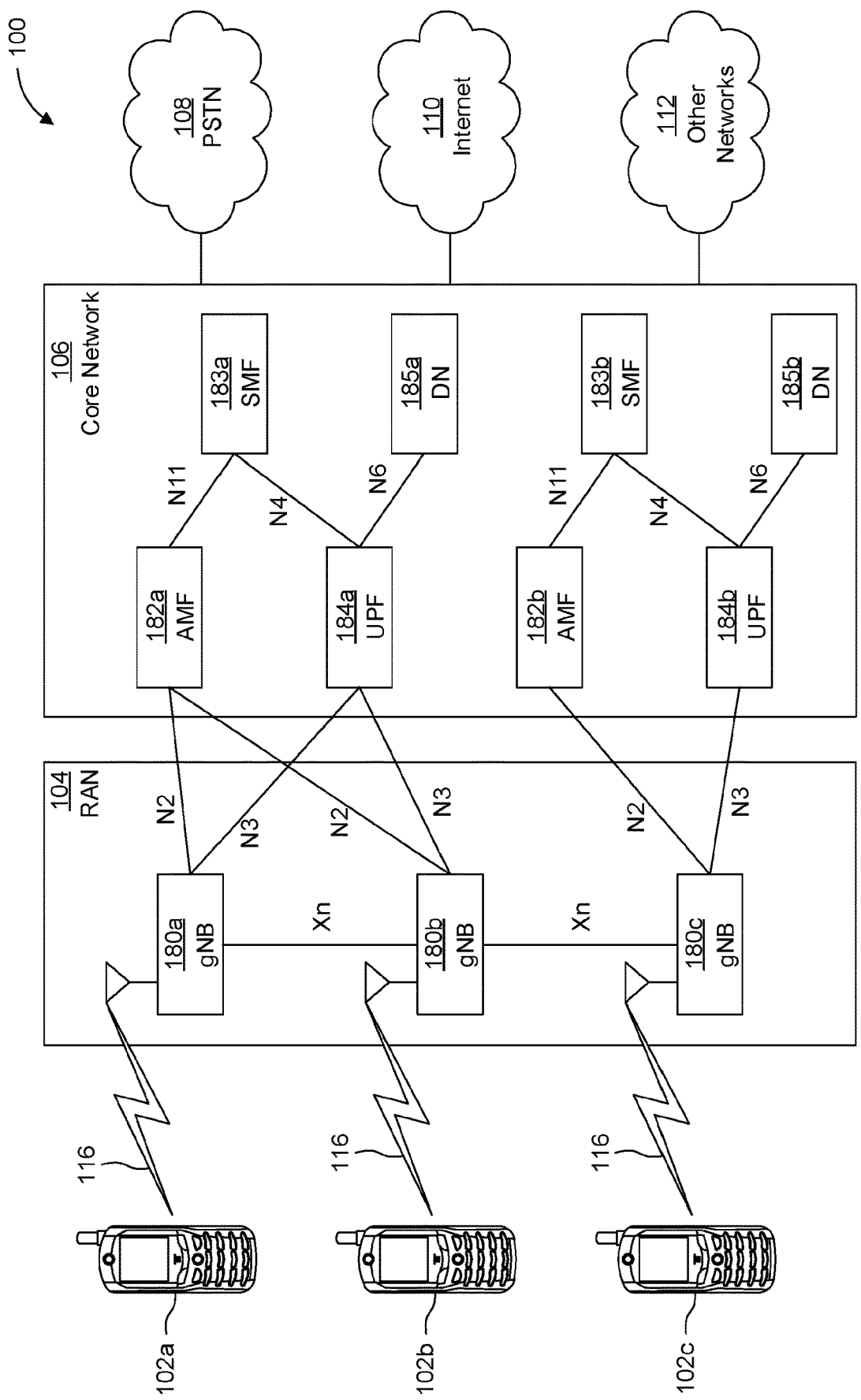
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

According to some schemes to which embodiments described herein may be directed, it may be possible to have CSI reference signal (RS) (e.g., non-zero power (NZP) CSI-RS) resources for channel measurements associated with different TRPs, panels, and/or TCI states at the resource level for CSI measurements in NCJT with a single reporting setting. As such, the channel measurement resources (CMRs) corresponding to different TRPs/panels/TCI states may be configured within the same CSI-RS resource set and may have the same number of CSI-RS ports.

Questions may remain whether to use CSI-RSs or CSI interference measurements (IMs) for the interference measurement. Methods for evaluating channel measurements for the different TRPs, panels, or TCI states, and how to associate the CMR and IMR attributes may be considered.

There may exist a fundamental problem in establishing the CSI measurements for an SDM NCJT based on CMR and interference measurement resources (IMR) as described in Release 16 specifications. It may due to the fact that inter-layer interference from another TRP/panel presented by the other TCI state may not be the same as interference measured using techniques employing CSI-IM or NZP-CSI-RS. Such techniques may result in inaccurate estimation of the channel information.

In SDM NCJT multi-TRP/panel networks, signals may be constrained into the desired subspaces through cooperative precoding at the TRPs/panels. As such, the desired signal may be recovered at the receiver as different layers of the same codeword. Instead of treating the signals from other TRPs/panels as interference, signals may be considered in association with pre-coded signals from the primary TRP/panel. Thus, CSI may be calculated accurately and with no down-estimation.

One question addressed in the following embodiments may be how to measure and report CSI including PMI, RI, CQI, and other metrics to decrease the inter-layer interference for NCJT CSI with a single reporting setting.

Some solutions may provide for an association of precoders in joint CSI measurements for the NCJT with a single report configuration. In some methods, a WTRU may associate and employ the CSI-RS resource signals received from the TRPs/panels in joint CSI measurements for the NCJT with a single report configuration. The WTRU may measure, generate, and report the CSI and in particular the precoder/transmitter filters to be used at the TRPs/panels. As such, the signals transmitted from the TRPs/panels may be received at the WTRU as transmission layers of the same codeword. The terms precoder and transmit filter may be referred to interchangeably herein.

A WTRU may measure and report CSI in a single-TRP/panel mode or in a multi-TRP/panel connection mode, wherein the channel state information (CSI) reporting for each connection mode may include or be configured with one or more of following parameters, rules, or configurations. For example, the configuration for each connection mode may include a CSI report configuration, including one or more of the following: a CSI report quantity (such as a Channel Quality Indicator (CQI), Rank Indicator (RI), Precoding Matrix Indicator (PMI), CSI-RS Resource Indicator (CRI), Layer Indicator (LI), etc); a CSI report type (such as aperiodic, semi persistent, or periodic types); a CSI report codebook configuration (e.g., Type I, Type II, Type II port selection, etc); or a CSI reporting frequency.

The CSI resources to be measured in each connection mode may be configured in a CSI-RS resource set, and may include one or more of the following: a CSI-RS resource for channel measurement (e.g., an NZP CSI-RS resource for channel measurement); a CSI-RS resource for interference measurement (e.g., an NZP CSI-RS resource for interference measurement); or a CSI-IM resource for interference measurement.

The CSI resource to be measured in each connection mode may include NZP CSI-RS resources, which may be associated with one or more of the following parameters: an NZP CSI-RS resource ID; periodicity and offset; QCL Info and TCI-state; or a resource mapping (e.g., number of ports, density, CDM type, etc).

In some solutions, a WTRU may be configured with a single CSI report configuration with at least one CSI-RS resource set, and each CSI-RS resource set may include at least as many CSI-RS resources as the number of the TRPs/panels. In some examples, each CSI resource set may include channel and/or interference measurement resource for each TRP/panel/TCI-state.

In some embodiments, two or more TRPs/panels may coordinate in communicating with a WTRU. A scheme as provided in this disclosure may provide for a two-TRP/panel system hereafter. However, the methodologies, procedures and computations may be expanded to more TRPs/panels, if required.

In some examples, in a two-TRP/panel model, a WTRU may be configured with at least one CSI-RS resource set, where each CSI-RS resource set may be configured with at least two CSI-RS resources. In some examples, each CSI-resource set may include channel and/or interference measurement resources for each TRP/panel/TCI state.

A CSI-RS resource set may include at least a first CSI-RS resource corresponding to the first TCI-state, which may be linked to the first TRP/panel, and at least a second CSI-RS resource corresponding to the second TCI-state, which may be linked to the second TRP/panel. The first CSI-RS resource or resources may be associated with the second CSI-RS resource or resource set.

The CSI-RS resource set corresponding to each TRP/panel may include one or more CSI-RS resources (e.g., NZP CSI-RS resources) for channel measurements. The CSI-RS resource set corresponding to each TRP/panel may include one or more CSI-RS resources (e.g., NZP CSI-RS resources) for interference measurements, where the CSI-RS resource for interference measurements included in the second CSI-RS resource set may be the same as the CSI-RS resource for interference measurements included in the first CSI-RS resource set.

Alternatively, or additionally, a WTRU may receive configuration information indicating multiple CORESETs and/or search spaces. Each CORESET or search space may be configured with, or associated with, a TCI-state that may correspond to a TRP/panel.

A WTRU may be configured with at least one CSI-RS resource set. Each CSI-RS resource set may be configured with a single CSI-RS resource. As such, the same CSI-RS resource set may be used for both TRPs. A WTRU may assume that the CSI-RSs from the same resource set do not collide in time or frequency. In other words, the CSI-RS resources of the same resource set may be orthogonal. When a WTRU monitors a search space, the TCI-state corresponding to the received CSI-RS may be determined based on the TCI-state configured for that search space. As such, the corresponding TRP may be determined.

In some examples, in a multi-TRP/panel system with more than two TRPs/panels, a WTRU may be configured with at least one CSI-RS resource set. The CSI-RS resource set may include at least as many CSI-RS resources as the number of the TRPs/panels, where one or more of the CSI-RS resources may correspond to one of the TCI-states linked to one of the TRPs/panels. The CSI-RS resource or resources corresponding to each TRP/panel may include one or more NZP CSI-RS resources for the channel measurement. The CSI-RS resource or resources corresponding to each TRP/panel may include one or more NZP CSI-RS resources for the interference measurement. The NZP CSI-RS resources for the interference measurement corresponding to different TRPs/panels may be associated pairwise, or in a one-to-one relationship with each other. The NZP CSI-RS resources for the interference measurement corresponding to the CSI-RS resource setting linked to a TCI-state/TRP/panel may be the same as the NZP CSI-RS resources for interference measurements corresponding to the CSI-RS resources linked to another TCI-state/TRP/panel.

In some solutions, a WTRU may receive information triggering or activating the multi-TRP/panel CSI reporting configuration. The WTRU may measure and report the CSI in two successive reporting modes, namely, single-TRP/panel reporting mode and multi-TRP/panel reporting mode.

Some procedures as descried herein may define a two-step CSI measurement process for a MTRP NCJT transmission. In procedures as may be implemented in a WTRU, each step may include two events: reception of CSI-RSs, and reporting of CSI.

In a first step, a first TRP (i.e., TRP 1) may be configured to transmit first CSI-RSs (e.g., an NZP CSI-RS) and second TRP (i.e., TRP 2) may be configured to transmit second CSI-RSs (e.g., an NZP CSI-RS). A WTRU may receive the first NZP CSI-RSs and the second NZP CSI-RSs from a first and a second TRP according to their corresponding configured TCI information. A WTRU may receive each of the NZP CSI-RSs according to their time/frequency configuration. A WTRU may assume that received NZP CSI-RSs do not collide in time or frequency. In some solutions, a WTRU may assume to have multiple CSI-RS resource configurations where it may use each for a different step. In some solutions, a WTRU may assume to employ a single CSI-RS configuration for all steps. Alternatively, or additionally, a WTRU may receive a single CSI-RS configuration where its content includes information for more than one CSI-RS resource that is required for both steps.

In a second step, a WTRU may report CSI measurements following reception of the NZP CSI-RSs. In some solutions, a WTRU may assume to have multiple CSI measurement content configurations and reporting resources, and it may use each of the multiple measurement content configurations and/or reporting resources for a different step. In some solutions, a WTRU may employ a single CSI measurement content configuration and reporting resources for all steps. Alternatively, or additionally, a WTRU may receive a single configuration for CSI measurement content and reporting resources where its content includes more than one CSI measurement content and reporting resources required for both steps.

Figure 2:
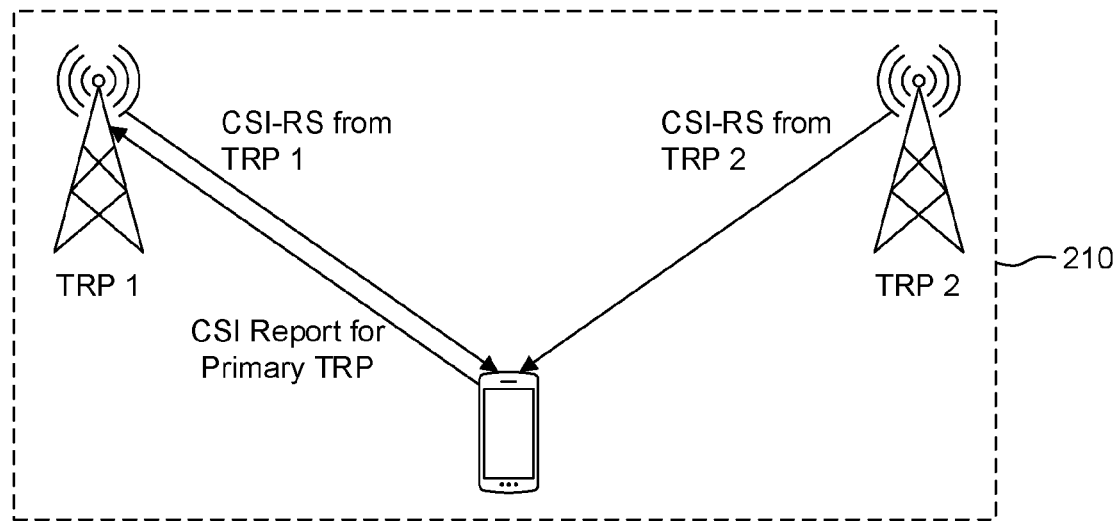
FIG. 2 illustrates a procedure for association of precoders in CSI measurement for MTRP NCJT with single CSI reporting.
Figure 2:
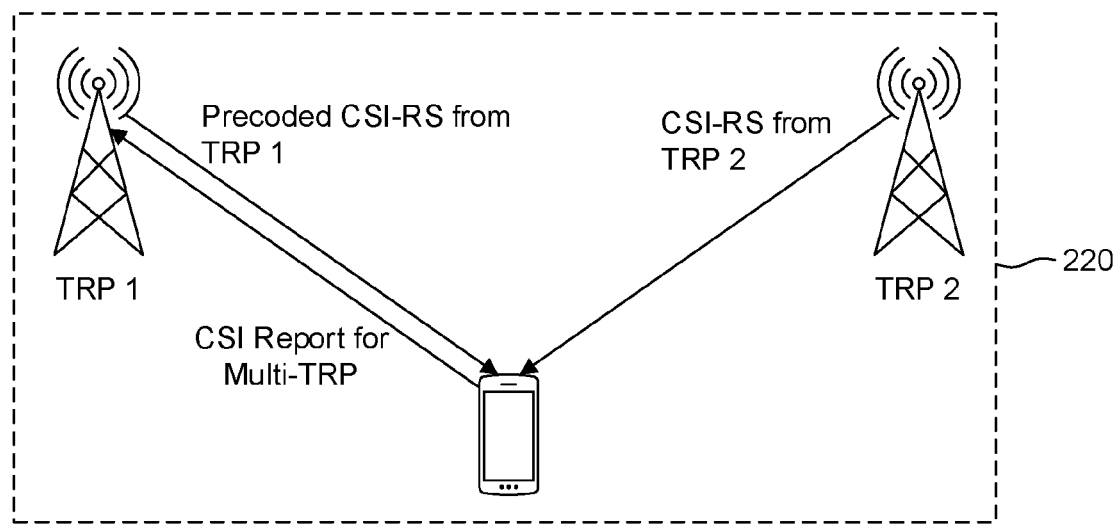

FIG. 2 illustrates an exemplary CSI measurement and reporting process as may be implemented in a system having multiple TRPs. The procedure shown may provide for an association between precoders in CSI measurement for MTRP NCJT with single CSI reporting, consistent with at least some of the methods described above.

The process shown in FIG. 2 may be outlined as follows. In a first step 210 of the process, the WTRU may receive CSI-RS transmitted by TRP 1 and TRP 2 on the first and second CSI-RS resources respectively. The WTRU may measure the received CSI-RSs. Based on the measurements of the received CSI-RSs, the WTRU may report CSI, which may include information indicating at least a preferred PMI associated with TRP 1. At this step, CSI-RSs received from the second TRP may provide a reference for determining the interference present within the channel carrying CSI-RSs from the first TRP, and such information may be necessary for computation of the PMI for TRP 1. In other words, the WTRU may use the CSI-RS received from the second TRP to measure channel characteristics to determine the PMI for TRP 1.

In a second step 220 of the process, a WTRU may perform a similar measurement and reporting but for the second TRP. For example, the WTRU may receive CSI-RSs transmitted by TRP 1 and TRP 2, respectively. The WTRU may perform measurements on the received CSI-RSs. Based on the measurements performed on CSI-RS resources for TRP 1 and TRP 2, the WTRU may report CSI, including information indicating at least a preferred PMI for TRP 2. Here, the CSI-RS received from TRP 1 in step 220 may provide a reference for determining the interference present within the channel carrying CSI-RSs from the second TRP, and such information may be necessary for computation of the PMI for TRP 2. In this step, the WTRU, having reported CSI to TRP 1 (including, e.g., an indication of the preferred PMI) in the previous step 210 may assume that received CSI-RSs from TRP 1 are precoded based on the PMI determined for TRP 1 (e.g., PMI-1). Therefore, in computing the preferred PMI for TRP 2, the WTRU may emulate, or account for inter-layer interference based on the measurement of the CSI-RSs from TRP 1 and associated PMI, determined in step 210.

Figure 3A:
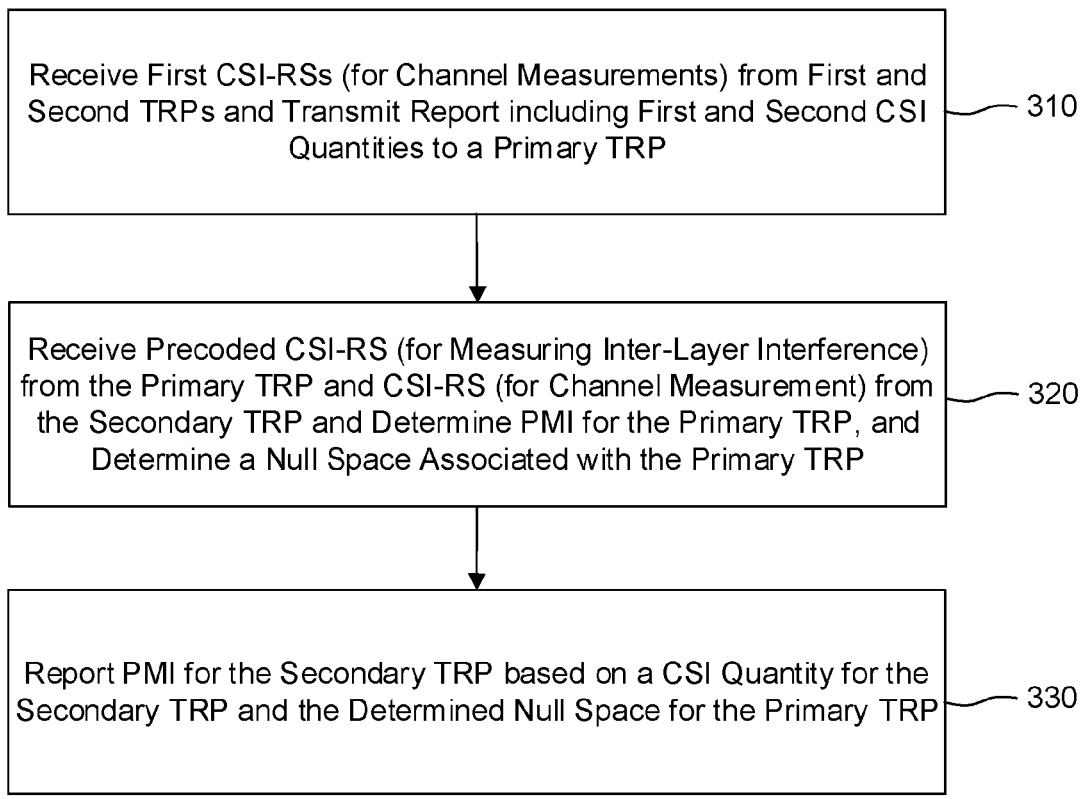
FIG. 3A is a flow diagram describe generalized steps of a procedure as may be performed by a device, operating in a multi-TRP system, that receives CSI-RSs, and measures and reports CSI.
Figure 3B:
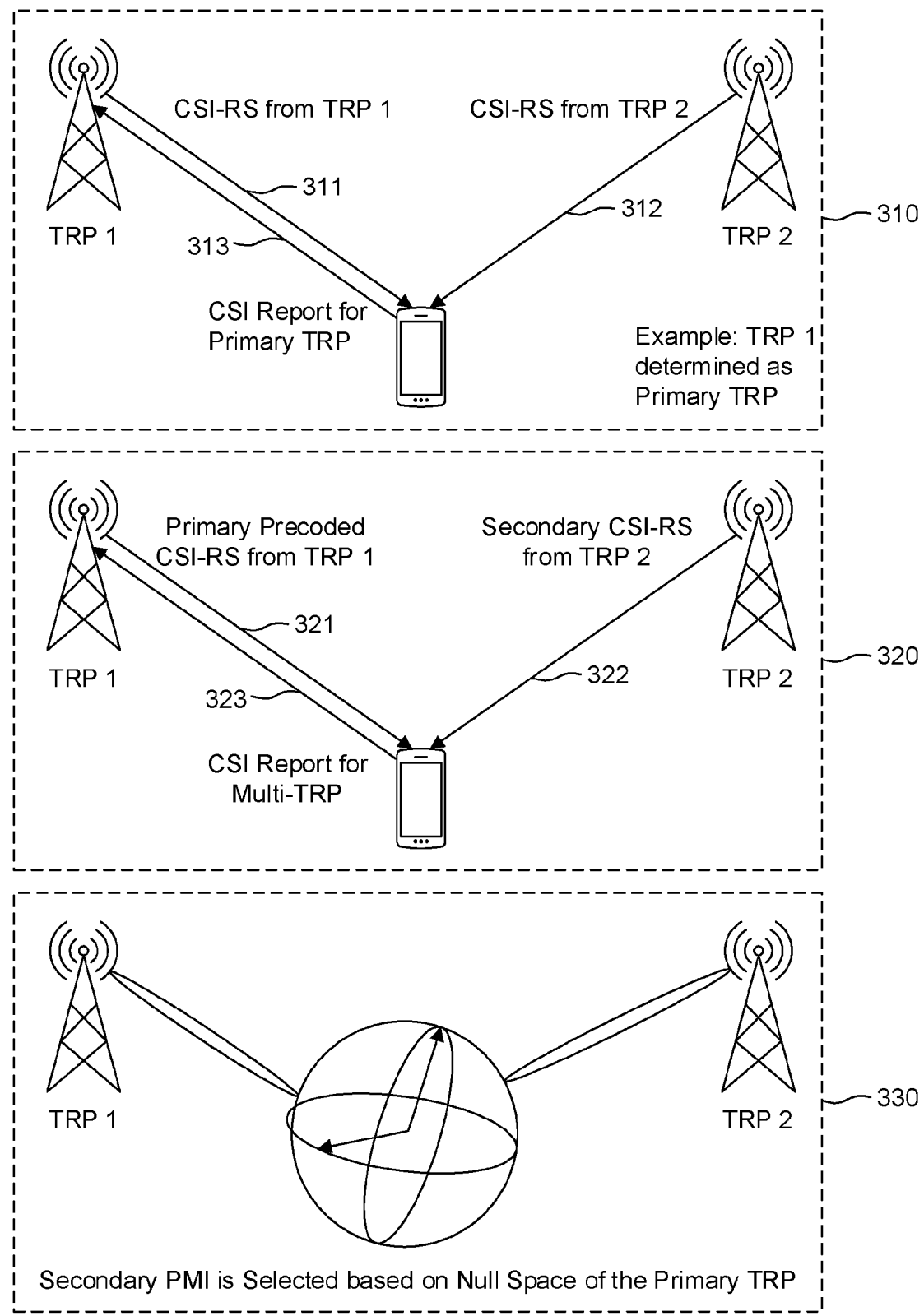
FIG. 3B is a diagram illustrating signaling as may be performed by devices operating in a multi-TRP system, where CSI-RSs are transmitted and CSI is measured and reported.

FIG. 3A and FIG. 3B are a flow chart and a diagram respectively illustrating an exemplary procedure for multi-TRP CSI estimation and reporting. Some procedures consistent with the procedure shown may be summarized as follows.

FIG. 3A and FIG. 3B describe a procedure as may be performed by a device, operating in a multi-TRP system, that receives CSI-RSs, and measures and reports CSI. The device operating in the multi-TRP system may be, as described in the following paragraphs, a WTRU, though it should be appreciated that a corresponding procedure may be performed by a base station, a network node, a nodeB, a TRP, an AP, a STA, or a UE.

FIG. 3A describes generalized steps of the procedure, while FIG. 3B illustrates signaling of the involved system participants performing steps in accordance with the generalized procedure outlined in FIG. 3A. As described substantially in paragraphs above, though not depicted in FIG. 3A or FIG. 3B, a WTRU that performs the described procedure may initially receive configuration information indicating resources for receiving CSI-RSs. The CSI-RS resources may carry CSI-RSs that may be used to calculate channel interference and inter-layer interference between TRPs of the system. The CSI-RSs subsequently received may be different CSI-RSs, and may be orthogonal to each other. The CSI-RSs may be NZP CSI-RSs.

As shown in FIG. 3A, at 310, a WTRU may receive one or more first CSI-RSs from a first TRP (i.e., TRP 1) and a second TRP (i.e., TRP 2) for channel measurement and transmit a report including respective first and second CSI quantities to a primary TRP. The first CSI-RSs may be used for measurement or estimation of the channel(s) on which TRP 1 and TRP 2 operate. With reference to FIG. 3B, the one or more respective first CSI-RSs are shown by elements 311 and 312. The WTRU may measure and determine the respective first CSI quantity for each of TRP 1 and TRP 2 based on the respectively received one or more first CSI-RSs. The WTRU may select the primary TRP as either TRP 1 or TRP 2 and may select the other TRP as a secondary TRP. The selection may be based on the first CSI quantities of TRP 1 and TRP 2, and the CSI quantity may include one or more of a reference signal received power (RSRP), a signal to interference ratio (SINR), or a channel quality indicator (CQI). A selection based on the first CSI quantities may be further based on a threshold (i.e., a comparison of one or both of CSI quantities to an absolute threshold or a relative threshold). As shown at 313 in FIG. 3B, the report may be transmitted, at least including the determined first CSI quantity for the primary TRP. A device that receives the report (e.g., the primary TRP, a base station or network node, and/or possibly the secondary TRP(s)), may be aware of the selection of the primary TRP. For example, a CSI resource indicator may be included in the report and may be an implicit indication of the selection.

As shown at 320, the WTRU may receive one or more second CSI-RSs (321 and 322, as shown respectively in FIG. 3B) from the primary TRP and from the secondary TRP. The CSI-RS 321 received from the primary TRP may be precoded based on the CSI reported for the primary TRP in step 310, and may be used for measurement or estimation of inter-layer interference between TRP 1 and TRP 2. The CSI-RS 322 received from the secondary TRP may be used for measurement or estimation of the channel(s) on which TRP 2 operates. The WTRU may determine a second CSI quantity and/or a PMI for the primary TRP based on the one or more second CSI-RSs received from the primary TRP. The WTRU may also determine channel coding parameters (e.g., a null space of a channel matrix) associated with the one or more second CSI-RSs received from the primary TRP. As shown at 323, the WTRU may report the second CSI quantity and/or PMI for the primary TRP that was determined based on the received CSI-RS 321.

As shown at 330, the WTRU may determine a second CSI quantity for the secondary TRP based on the CSI-RS 322. The WTRU may determine a PMI (i.e., a preferred PMI) for the secondary TRP based on the determined channel coding parameters (i.e., the determined null space, such that a preferred precoding matrix indicated by the PMI lies within the null space of a channel matrix associated with the primary TRP) and the determined second CSI quantity for the secondary TRP. The WTRU may report the determined PMI for the secondary TRP. The determined PMI may be such that inter-layer interference between the primary TRP and the secondary TRP is minimized.

Further details as to the single-TRP/panel reporting mode are described herein. In the single-TRP/panel reporting mode, a WTRU may measure and report CSI corresponding to the TRPs/panels independently and separately based on CSI-RSs for the channel measurement. The procedure may include one or more of the following procedures or conditions.

For example, a WTRU may receive CSI-RSs from first and second TRPs. The WTRU may use the received CSI-RSs for channel measurement for the TRPs/panels. The CSI-RSs for channel measurement may be different and orthogonal. A WTRU may measure the CSI for each TRP/panel separately. A WTRU may select one of the TRPs/panels as the primary TRP/panel and the other TRP/panel as the secondary TRP/panel. A WTRU may measure the CSI quantities corresponding to the primary TRP/panel, including the RI and PMI, and may report the CSI corresponding to the primary TRP/panel to a network node (e.g., a TRP, base station, nodeB, or another device).

As for the selection of the TRPs/panels to be primary or secondary, a WTRU may select the TRPs/panels based on different sets of parameters. In some examples, a WTRU may be configured by a base station, nodeB, or other network node (e.g., through RRC messaging, a MAC CE, or any logical equivalent message) with an indication of which TRP/panel should be selected as the primary TRP and which TRP(s) or panel(s) should be selected as a secondary TRP. In some examples, a WTRU may select the primary TRP/panel based on the higher L1-RSRP, L1-SINR, CQI, and/or according to a predetermined/configured threshold.

Further details as to the multi-TRP/panel reporting mode are described herein. In a procedure involving two or more steps, this mode may follow the single-TRP/panel reporting mode. Based on the CSI reported by the WTRU operating in the single-TRP/panel reporting mode, a network node (e.g., a TRP, base station, nodeB, or another device) may determine a precoder/transmitter filter to be used for the transmission layers corresponding to the primary TRP/panel. The network node may use this precoder/transmitter filter (or send configuration information indicating to use the determined precoder/transmitter filter) for the transmission of CSI-RSs from the primary TRP/panel in the multi-TRP/panel reporting mode.

In the multi-TRP/panel reporting mode, the procedure may include one or more of the following conditions or procedures. For example, a WTRU may receive precoded CSI-RSs (e.g., NZP CSI-RSs) from the primary TRP/panel, where the NZP CSI-RS is precoded based on the PMI reported previously and during the single-TRP/panel reporting mode. The received precoded CSI-RS may be used to measure interference between the primary TRP/panel and a secondary TRP/panel. Based on, for example, release 16 technical specifications, a WTRU may assume the CSI-RS configured for interference measurement corresponds to a transmission layer.

A WTRU may also receive CSI-RSs, to be used for channel measurement, from the secondary TRP/panel.

A WTRU may determine the precoder/transmitter filter to be used at the first and the second TRP/panel. The WTRU may measure the CSI and determine, specifically, the PMI for the primary TRP/panel based on the corresponding CSI-RS resource for the interference measurement. The WTRU may measure the CSI for secondary TRP/panel based on the corresponding CSI-RS to be used for the channel measurement. The WTRU may select the PMI for the secondary TRP/panel based on a null space of the precoded CSI-RS received from the primary TRP/panel. In the process of measuring the CSI for the secondary TRP/panel, the WTRU may consider the precoded signals received from the primary TRP/panel as another layer of the same codeword of a NCJT.

In other words, a WTRU may consider the signals received from the primary TRP/panel as the basis to calculate the CSI/PMI for the secondary TRP/panel, as if they were transmitted from the secondary TRP/panel. The WTRU may determine a PMI linked for the secondary TRP/panel so that it is consistent with a TCI-state of the secondary TRP/panel, oriented in line with beams' carrying signals from the secondary TRP/panel, and orthogonal with signals received from the primary TRP/panel. The formulation may be provided as follows, such that it is based on a null-space of the precoding matrix selected based on the precoded CSI-RS received from the first TRP/panel.

At the conclusion of procedures performed in the multi-TRP/panel reporting mode, a network node (e.g., a TRP (such as one the primary and/or secondary TRPs), a base station, a nodeB, or another device) may have access to both single-TRP/panel and multi-TRP/panel CSI from the WTRU. As such, switching at the network node between the single and multi-TRP/panel schemes may be accomplished dynamically and based on the provided CSI reports.

In some solutions, a multi-TRP/panel reporting mode may be used independent of a single-TRP/panel reporting mode. For example, a WTRU may determine a PMI for CSI-RSs for TRP1 (i.e., PMI-1) in a multi-TRP/panel reporting mode, and then determine a PMI for the CSI-RSs for TRP2 (i.e., PMI-2) with emulated interference that is based on the CSI-RSs for TRP1 and its associated PMI. One or more of following conditions or procedures may apply.

For example, a WTRU may report both PMI-1 and PMI-2 in a single CSI report with associated CQI and RI. One or more PMI-1 may be determined or selected by a WTRU. For example, the WTRU may select and/or determine the best-M (e.g., M>=1) PMI-1 that may provide a highest observed CQI value for a given channel condition measured from CSI-RS received from TRP-1. When more than one PMI-1 is selected, determined, or used, the WTRU may also select/determine PMI-2 for each PMI-1 value; As a result, M sets of PMI-1 and PMI-2 values may be selected or determined. The WTRU may report the M sets of PMI values (PMI-1, PMI-2) and their associated CQI and/or RI. When a single PMI-1 is selected, determined, or used, the WTRU may select or determine a single PMI-2 based on the determined PMI-1. The Mth value may be determined based on at least one of following: a number of TRPs/panels configured for a Multi-TRP/panel reporting mode; a number of CSI-RS resources for channel measurement in the associated CSI resource setting; a configuration information provided in a message from a network node (e.g., an RRC message, a MAC-CE, or another logically equivalent message); a reporting channel capacity (e.g., number of bits available for the reporting); a channel quality metric (e.g., SINR range, RSRP range, CQI, RI, etc.); or a WTRU capability.

In some solutions, one or more multi-TRP/panel reporting modes may be used, configured, or defined. For example, a first multi-TRP/panel reporting mode (e.g., a Type-1 multi-TRP/panel reporting mode) may be based on the CSI reporting per TRP/panel without the successive PMI determination/selection for the emulated interference (e.g., interlayer interference). A second multi-TRP/panel reporting (e.g., Type-2 multi-TRP/panel reporting mode) may be based on the CSI reporting for multiple TRP/panels with the successive PMI determination/selection. The type of multi-TRP/panel reporting mode may be determined based on at least one of following: a WTRU capability; configuration information received from a network node (e.g., an RRC message, MAC-CE, or another logical equivalent); or an indication in a triggering DCI (e.g., for aperiodic/semi-persistent reporting).

Formulas as may be used in embodiments throughout are described. In order to calculate the optimal precoders linked to a secondary TRP/panel, the precoder may be associated with the null space of the primary TRP/panel.

A procedure for the determination of the secondary PMI in the multi-TRP/panel reporting mode may be carried out in accordance with one or more of the following rules or criteria. For example, the procedure may consider the TCI-state associated with the secondary TRP/panel, and may involve the computation of one or more corresponding channel coding parameters (e.g, $H_P$ and $H_S$ as channel matrices, along with other related variables) from the primary and secondary TRPs/panels, respectively. Theoretically, zero inter-layer interference may require that the precoding for the secondary TRP/panel lie in the null space of the $H_P$. The rank of the $H_P$ may be defined as $R_P$=rank $(H_P)$. The singular value decomposition (SVD) may be defined by: $H_P = U_P \Sigma_P [V_P^{(1)} V_P^{(0)}]^H$ where $V_P^{(1)}$ holds the first $R_P$ right singular vectors and $V_P^{(0)}$ holds the last $(n_T - R_P)$ right singular vectors, and where $n_T$ is the number of CSI-RS ports (antennas) at TRPs/panels. $V_P^{(0)}$ may form an orthogonal basis for the null space of $H_P$, and its columns may be the candidates for the precoding matrix of the secondary TRP/panel. Finally, the WTRU may select the PMI (e.g., based on channel coding parameters including channel matrices and/or null spaces) to minimize the mismatch between the precoder and the secondary TRP/panel channel matrix and/or minimize the mismatch between the precoder and the null space of the primary TRP/panel channel matrix.

Some solutions may involve the joint selection of antenna ports associated with CSI-RSs based on UL/DL angle reciprocity. For example, in some methods, a WTRU may employ CSI-RS port selection in joint CSI measurements for the NCJT in a single TRP/panel reporting mode, in which the CSI-RSs may be associated. The WTRU may measure the CSI based on precoded CSI-RSs received from the multiple TRPs/panels. Consistent with, for example, release 16 technical specifications, a WTRU may assume the CSI-RSs may be used to measure interference between different transmission layers. The WTRU may jointly select and report the most favorable port-pair from the TRPs/panels.

A WTRU may measure and report the selection of antenna ports associated with the CSI port selection, wherein the CSI for each connection mode may include or be configured with one or more configurations, parameters, or resources. For example, the CSI may be provided consistent with a CSI Report Configuration that includes information indicating one or more of the following: a CSI report quantity, e.g., Channel Quality Indicator (CQI), Rank Indicator (RI), Precoding Matrix Indicator (PMI), Layer Indicator (LI), etc.; a CSI report type, e.g., aperiodic, semi persistent, or periodic report types; a CSI report codebook configuration (defined, for example, as TypeII-PortSelection or TypeII-PortSelection-r16); or a CSI report frequency.

The CSI may be reported for resources of a CSI-RS resource set, including one or more of the following CSI resources: an NZP CSI-RS resource for channel measurement; an NZP CSI-RS resource for interference measurement; or a CSI-IM resource for interference measurement.

The CSI may be reported for CSI-RS resources, including one or more of the following: an NZP CSI-RS resource ID; a periodicity and offset; QCL Info and TCI-state; or a resource mapping, such as a number of ports, density, CDM type, etc.

In some solutions, a network node (e.g., a TRP, a base station, a nodeB, or another device) may precode CSI-RSs for interference measurement based on UL measurements corresponding to the resources for transmission of the CSI-RS. For example, the WTRU may transmit sounding reference signals, which may be received by the network node. The network node may measure the SRS received from the WTRU and the angel reciprocity of the UL and DL may be exploited to determine how to precode CSI-RSs that are to be subsequently transmitted.

In a two-TRP/panel model, the WTRU may be configured with a single CSI report configuration, with at least one CSI-RS resource set, wherein each CSI-RS resource set includes at least two resources for transmission of CSI-RSs (e.g., for channel and interference measurements per each TRP/panel/TCI state). The CSI-RS resource set may include first CSI-RS resources corresponding to the first TCI-state linked to the first TRP/panel and second CSI-RS resources corresponding to the second TCI-state linked to the second TRP/panel. The CSI-RS resources corresponding to the first TCI-state and the second TCI-state may be associated with each other. The CSI-RS resources corresponding to each TRP/panel may include one or more NZP CSI-RS resources for the channel measurement. The CSI-RS resources corresponding to each TRP/panel may include one or more NZP CSI-RS resource for the interference measurement.

The CSI-RS resources for channel measurement and interference measurement corresponding to the TRPs/panels may be paired resource-wise with each other. In other words, the CSI-RS resource for the channel measurement for the first TRP/panel may be configured to be the same as the CSI-RS resource for the interference measurement of for second TRP/panel. Likewise, the CSI-RS resource for the channel measurement of the second TRP/panel may be configured to be the same as the CSI-RS resource for the interference measurement of the first TRP/panel.

Figure 4:
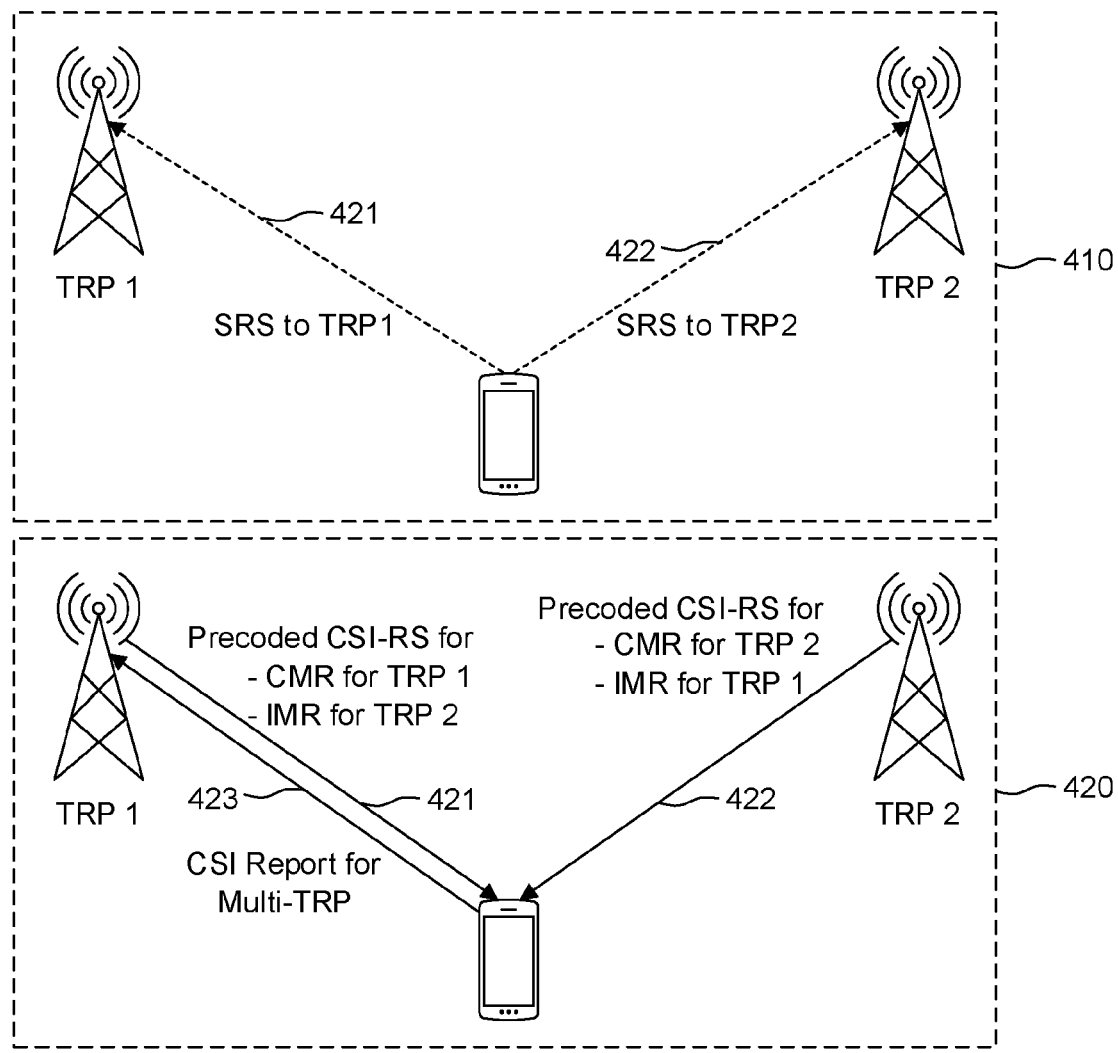
FIG. 4 is a diagram illustrating an example solution exploiting the angle reciprocity from a sounding reference signal (SRS) in measuring CSI for MTRP NCJT with single CSI reporting.

FIG. 4 depicts an example procedure for CSI reporting that exploits the angle reciprocity from SRS measurements.

Although not depicted in FIG. 4, it should be appreciated that a WTRU may receive information triggering or an activating a multi-TRP/panel non-PMI port selection report configuration. The procedure to measure and report the CSI as illustrated in FIG. 4 may include one or more of the following conditions, steps, or procedures. For example, a WTRU may receive precoded CSI-RSs (e.g., NZP CSI-RSs) from the TRPs/panels. The CSI-RS resource used to carry CSI-RSs for the channel measurement from the first TRP/panel may be configured as a CSI-RS resource for carrying CSI-RSs for the interference measurement from the second TRP/panel. Likewise, the CSI-RS resource carrying CSI-RSs for the channel measurement from the second TRP/panel may be configured as the CSI-RS resource carrying CSI-RSs for the interference measurement from the first TRP/panel. The association between the CSI-RS resource may be configured based on the TCI-states linked to the TRPs/panels.

The procedure to measure and report the CSI as provided in FIG. 4 may involve the WTRU measuring the CSI for all pairs of the ports corresponding to the precoded CSI-RSs received from the TRPs/panels.

The procedure to measure and report the CSI as provided in FIG. 4 may involve the WTRU reporting the most favorable pair of the ports corresponding to the precoded CSI-RSs received from the TRPs/panels.

As for the selection of the most favorable pair, a WTRU may select the pairs based on different sets of parameters. In some examples, the WTRU may select the favorable pair based on the a signal quality measurement (e.g., L1-RSRP, L1-SINR, CQI) and according to a predetermined/configured threshold.

The solution shown in FIG. 4 may be an exemplary two-step CSI measurement process for a M-TRP NCJT transmission. The two step process may be outlined as follows. In a first step 410, a WTRU may transmit at least one sounding reference signal (SRS) using configured SRS resources. If a WTRU embarks on a single SRS transmission event, it may use only a single spatial filter that may be defined by the configured spatial relation information. However, if it transmits more than one SRS as shown in step 410 by signals 411 and 412, it may use different spatial filters (i.e., different spatial relation information that may correspond to different TRPs.

In some solutions, a WTRU may use a specific subset of SRS resources or SRS resource sets for the SRS transmissions in the first step. A WTRU may use the specific subset to trigger CSI-RS transmissions from TRPs, shown in step 420 and described in further detail herein. In some solutions, if SRS-based CSI acquisition for M-TRP architectures is activated, a WTRU may always expect reception of CSI-RS from TRPs at a pre-determined time and frequency resources. For example, the WTRU may expect to receive CSI-RS in a slot offset from the transmission of the SRS (e.g., slot n+4, where n is the slot in which the WTRU transmits one or more SRSs)t. Alternatively, or additionally, a WTRU may determine whether requested CSI-RS transmission as depicted in step 420 is available implicitly or explicitly. For example, a WTRU may monitor a dedicated CORESET or search space. On the other hand, a WTRU may receive a DCI or MAC CE, or another logical equivalent, including information indicating the transmission of the requested CSI-RS implicitly or explicitly.

In the second step of the process 420, based on the performed measurements on received NZP CSI-RSs from the first and second TRP (shown in FIG. 4 by elements 421 and 422, a WTRU may report CSI information indicating at least its preferred PMIs for each TRP. At this step, CSI-RSs received from one TRP may be considered a basis for determining inter-layer interference needed for computation of PMI of the other TRP.

In some solutions, the second step 420 may include two or events: the WTRU receiving a CSI-RS, and the WTRU reporting CSI.

In some solutions, in the reception of CSI-RS, a WTRU may receive an indication of a first set and a second set of NZP CSI-RS resources from a first and a second TRP according to their corresponding configured TCI information. A WTRU may receive NZP CSI-RSs from each TRP according to their time/frequency configuration. A WTRU may assume that the received NZP CSI-RSs do not collide in time or frequency. In some solutions, a WTRU may receive multiple CSI-RS resource configurations, which may correspond to different TRPs, from one of the TRPs. For example, the WTRU may receive information indicating the CSI-RS resource configuration via DCI from the primary TRP. In some solutions, a WTRU may receive multiple CSI-RS resource configurations related to each TRP from their corresponding TRP, e.g., through multiple DCI.

In some solutions, for WTRU reporting of CSI, a WTRU may report CSI measurements following reception of NZP CSI-RS resources. In some solutions, a WTRU may have multiple CSI measurement content configurations and reporting resources, and it may use each set of CSI measurement content configurations and reporting resources for a different TRP. In some solutions, a WTRU may employ a single CSI measurement content configuration and reporting resources for all TRPs. Alternatively, or additionally, a WTRU may receive information providing a single configuration for CSI measurement content and reporting resources. The configuration may indicate more than one type of CSI measurement content to be reported and reporting resources required for both TRPs.

Solutions involving dynamic switching between single and multiple TRPs/panel CSI reporting modes are described herein. In some solutions, a WTRU may dynamically switch a CSI reporting type between multiple CSI reporting types (e.g., between single TRP/panel CSI reporting, or multi-TRP/panel CSI reporting).

In some examples, CSI reporting for a single TRP/panel mode may include one or more of the following: a measurement based on a single CSI-RS resource; a single Rank Indicator (RI); a single CSI-RS Resource Indicator (CRI); a single quality indicator (e.g., one or more of Channel Quality Indicator (CQI), L1-RSRP and L1-SINR); a single set of Precoding Matrix Indicators (PMI), e.g., wideband w1 and wideband w2, wideband w1 and subband w2s, or similar; or a single Layer Indicator (LI).

In some examples, CSI reporting for multi-TRP/panel may include one or more of the following: a measurement based on multiple CSI-RS resources; multiple RIs; multiple CRIs; multiple quality indicators (e.g., one or more of Channel Quality Indicator (CQI), L1-RSRP and L1-SINR); multiple sets of PMIs e.g., wideband w1 and wideband w2, wideband w1 and subband w2s, or similar; or multiple Ls.

In some solutions, a WTRU may determine a CSI reporting type based on one or more configurations or parameters.

A WTRU may determine a CSI reporting type based on configuration information received from a network node (e.g., a TRP, a base station, a nodeB, or another device). For example, the WTRU may receive configuration information (e.g., in a CSI reporting configuration) indicating a CSI type. The WTRU may receive information in a CSI-RS resource/resource set configuration indicating the CSI type. The WTRU may receive configuration information for multiple associated CSI-RS resources/resource sets that indicates the CSI type. If the WTRU receives a CSI-RS that does not have an associated CSI-RS resource, the WTRU may determine a first CSI reporting type (e.g., whether to perform CSI reporting for a single TRP/panel). If the WTRU receives a CSI-RS with one or more associated CSI-RS resources, the WTRU may determine a second CSI reporting type (e.g., to perform CSI reporting for multiple TRPs/panels).

In some examples, the WTRU may receive configuration information indicating a CSI type by receiving multiple associated CSI reporting configurations. For example, if the WTRU receives a CSI reporting configuration without an associated CSI reporting configuration, the WTRU may determine a first CSI reporting type (e.g., CSI reporting for a single TRP/panel). If the WTRU receives a CSI report config with one or more associated CSI reporting configuration, the WTRU may determine a second CSI reporting type (e.g., CSI reporting for multiple TRPs/panels).

A WTRU may determine a CSI reporting type based on a measurement and determined quality. For example, the WTRU may receive multiple CSI-RS configurations (e.g., indicating CSI-RS resources or resource sets). Based on the multiple CSI-RS configurations, the WTRU may measure a first CSI-RS. If the measured (and determined) quality of the first CSI-RS is higher than a threshold, the WTRU may determine a first CSI reporting type (e.g., CSI reporting for single TRP/panel). If the WTRU measured (and determined) a quality of the first CSI-RS configuration that is lower than (or equal to) the threshold, the WTRU may determine a second CSI reporting type, measure, and determine a joint quality based on the multiple CSI-RS configurations. The first CSI-RS configuration may indicate a CSI-RS resource/resource set for CSI reporting and additional CSI-RS resource/resource set configurations for CSI reporting type determinations.

In some examples, the WTRU may receive multiple CSI-RS configurations (e.g., resources or resource sets). Based on the multiple CSI-RS configurations, the WTRU may measure first CSI-RSs and second CSI-RSs. If the difference between a first quality of the first CSI-RSs and a second quality of the second CSI-RSs is higher than a threshold, the WTRU may determine a first CSI reporting type (e.g., CSI reporting for single TRP/panel). If the difference is lower than (or equal to) the threshold, the WTRU may determine a second CSI reporting type, measure and determine a joint quality based on the multiple CSI-RS configurations.

For example, the WTRU may receive multiple CSI-RS configurations (e.g., indicating resources or resource sets). Based on the multiple CSI-RS configurations, the WTRU may measure multiple CSI-RSs. If the measured (and determined) quality (e.g., averaged values) of the multiple CSI-RSs is higher than a threshold, the WTRU may determine a first CSI reporting type (e.g., CSI reporting for single TRP/panel). If the WTRU measured (and determined) a quality that is lower than (or equal to) the threshold, the WTRU may determine a second CSI reporting type, measure and determine a joint quality based on the multiple CSI-RSs.

A quality metric may include one or more of rank, CQI, SINR, RSRP, RSRQ, pathloss, location information, environment type (e.g., indoor or outdoor), amount of interference (e.g., interference quality indicator (IQI), P-MPR, or another metric.

If the WTRU supports multiple types of quality for the determination, the WTRU may receive a type of the multiple types from a network node (e.g., a TRP, base station, nodeB, or another device) for example via an RRC configuration per WTRU, CSI reporting configuration, CSI-RS configuration or another logical equivalent.

One or more thresholds may be used in the determination based on one or more of following: predefined values; indicated values (e.g., provided via RRC, MAC CE, DCI or any other logical equivalent); or WTRU-determined values (e.g., based on WTRU implementation or measurements). The term CSI reporting configuration may be interchangeably used with the term CSI-RS configuration but consistent with the described embodiments.

Rules for determination of overlapped PDCCHs in multi-TRP systems are described herein. PDDCH repetition by multi-TRP transmission is one technique that may be used to enhance PDCCH reliability.

Figure 5:
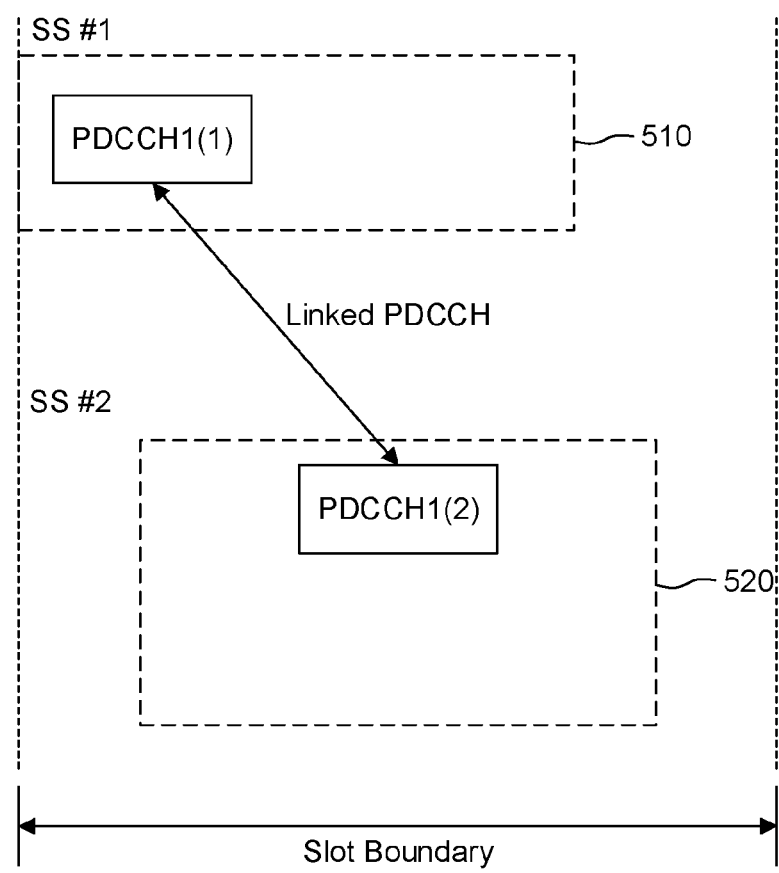
FIG. 5 is a diagram illustrating an example of a basic operation for PDCCH reliability enhancement carried out via repetition.

FIG. 5 illustrates an example of a basic operation for PDCCH reliability enhancement carried out via repetition. For enhanced PDCCH reliability with repetition, encoding and/or rate matching may be based on one repetition, and the same coded bits may be repeated for another repetition. The number of linked PDCCH candidates may be, for example, two, and each repetition may have the same number of CCEs and coded bits and correspond to the same DCI payload. For PDCCH repetition, a number (e.g., two) of linked PDCCH candidates may be received in two different CORESETs configured in two different search spaces. As shown in FIG. 5, two PDCCH candidates, i.e., PDCCH1(1) and PDCCH1(2), may be replicas of each other and may be transmitted from two different TRPs for enhanced reliability. Two search space sets 510 and 520 associated with corresponding CORESETs may be linked together, and the linkage between the two may be configured at a WTRU by messaging received from a network node (e.g., the linkage between the PDCCH candidates may be indicated by RRC message, or another logical equivalent). The two SS sets 510 and 520 may have the same aggregation level (AL) and the same candidate index and have the same number of candidates for each AL.

Further, the two linked SS sets 510 and 520 may be configured with the same SS set type (USS/CSS), the same DCI formats for monitoring, the same periodicity and offset (e.g., as indicated in messaging from a network node containing the monitoringSlotPeriodicityAndOffset element), and the same duration. It may be assumed that the two SS sets 510 and 520 may have the same number of monitoring occasions within a slot, where the n-th monitoring occasion of one SS set is linked to the n-th monitoring occasion of the other SS set.

In some embodiments, when two SS sets are linked for PDCCH repetition, they may not contain individual PDCCH candidates. For configuration of individual PDCCH candidates, a different SS set may be configured by the network (e.g., via downlink transmissions, RRC messages, MAC CEs or other logical equivalents), and it may be possible for one of the configured CORESETs in a SS for linked PDCCH to be shared by the search space of an individual PDCCH, i.e., a non-linked PDCCH.

Figure 6A:
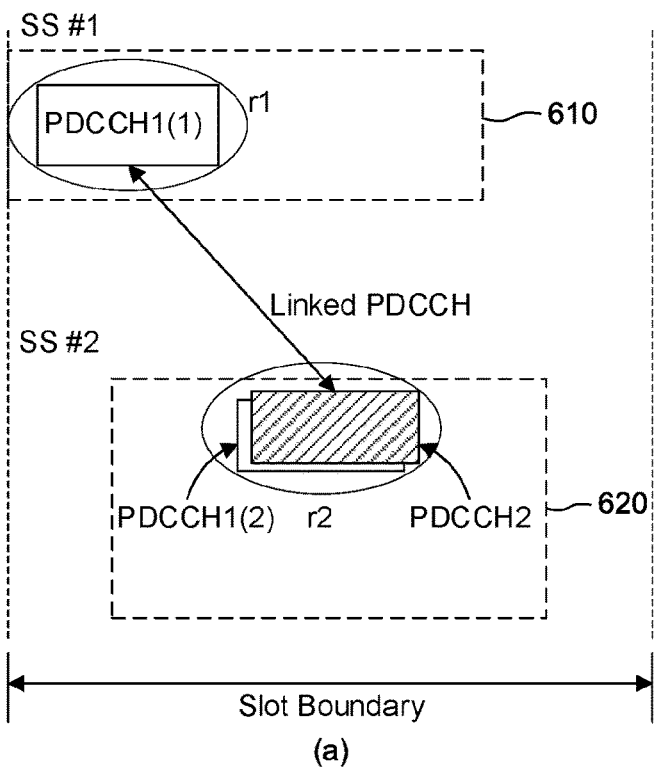
FIG. 6A is a diagram illustrating another case for PDCCH enhancement carried out via repetition in which PDCCH candidates are linked.
Figure 6B:
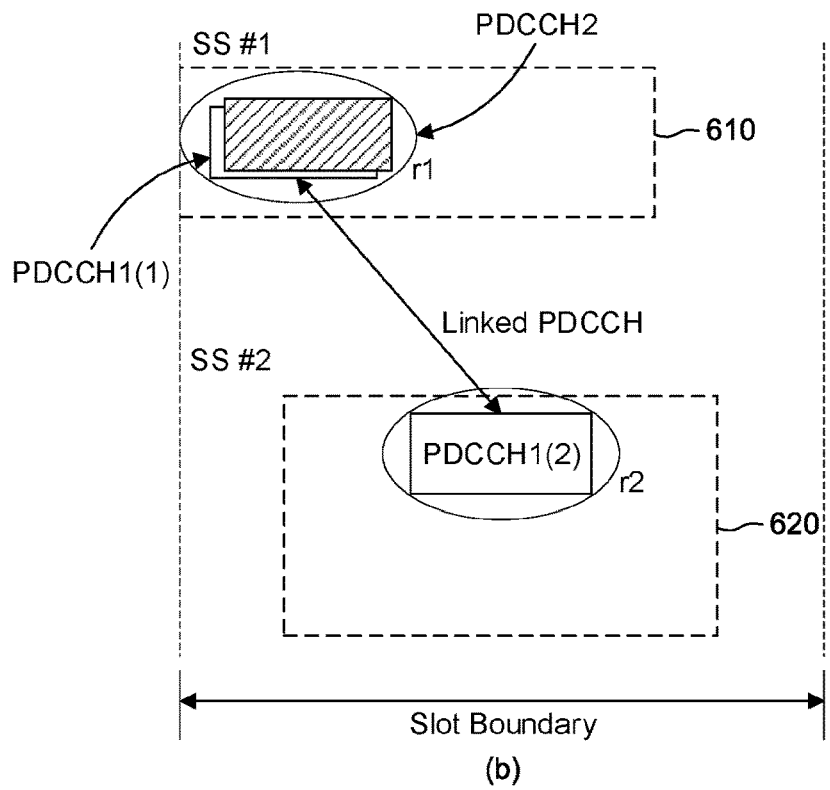
FIG. 6B is a diagram illustrating another case for PDCCH enhancement carried out via repetition in which PDCCH candidates are linked.

FIG. 6A and FIG. 6B illustrate another example operation for PDCCH enhancement through two different cases in which PDCCH candidates are linked. As shown in both case (a) and case (b), respectfully illustrated by FIG. 6A and FIG. 6B, one of the linked PDCCH candidates, PDCCH1, uses the same set of CCEs as an individual (unlinked) PDCCH candidate, PDCCH2, and both are associated with the same DCI size, scrambling, and CORESET. From the decoding perspective, depending on a WTRU receiver's processing and blind decoding (BD) capability, different outcomes may be expected.

As shown in FIG. 6A and FIG. 6B, r1 and r2 may be extracted signals from corresponding CORESETs in a first search space, SS #1 (shown by element 610), and a second search space, SS #2 (shown by element 620), respectively. For a WTRU with three-BD capability, in general, the WTRU may attempt to perform blind decoding three times as follows. In a first instance, the WTRU may attempt decoding of r1; in a second instance, the WTRU may attempt decoding of r2; and in a third instance, the WTRU may attempt decoding of a soft-combination of signals r1 and r2

Assuming the above order for decoding attempts and a given relative power, there may be no clear difference in decoding performance for the cases (a) or (b) shown in FIG. 6A and FIG. 6B. However, knowing which repetition of PDCCH1 is overlapped with the individual PDCCH may provide better performance and opportunities for power saving.

For a WTRU with a two-BD capability, in general, the WTRU may attempt to perform blind decoding twice as follows. In a first instance, the WTRU may attempt decoding of r1; in a second instance, the WTRU may attempt decoding of r2. Assuming the above order for decoding attempts and a given relative power, there may be no difference in decoding performance between the cases (a), shown in FIG. 6A, or (b), shown in FIG. 6B.

For a WTRU with two-BD and soft-combining capabilities, in general, the WTRU may attempt to perform blind decoding twice as follows. In a first instance, the WTRU may attempt decoding of r1; in a second instance, the WTRU may attempt blind decoding of a soft-combination of signals r1 and r2. Unlike the two previous cases, there may be a difference in decoding performance of the above order between cases (a) and (b) in FIG. 6A and in FIG. 6B. For instance, adopting the above order of attempts for case (b) may result in worse performance than for case (a).

In some embodiments, a WTRU may prioritize decoding of the extracted candidates, i.e., r1, r2, and/or the soft-combined signals r1 and r2 based on some information, e.g., a relative signal level, or whether the PDCCHs are overlapped, etc. In some solutions, based on one or more rules as described herein in further detail, a WTRU may determine which of the extracted signals, i.e., r1 or r2, carries the overlapped PDCCHs.

For example, a WTRU may determine whether a PDCCH candidate location contains only one of the linked PDCCH candidates based on the search space index. In some solutions, a WTRU may assume that an individual PDCCH may be received only in a search space with the highest (or lowest) ID.

A WTRU may determine whether a PDCCH candidate location contains only one of the linked PDCCH candidates based on a time reference. In some solutions, a WTRU may assume that an individual PDCCH transmission may be received only in a search space that starts earlier (or later) in time than another search space. Alternatively, or additionally, a WTRU may assume that an individual PDCCH transmission may be received only in a CORESET that starts earlier (or later) in time than another CORESET.

A WTRU may determine whether a PDCCH candidate location contains only one of the linked PDCCH candidates based on the CORESET index. In some solutions, a WTRU may assume that an individual PDCCH may be received only in a CORESET with a highest (or lowest) ID.

A WTRU may determine whether a PDCCH candidate location contains only one of the linked PDCCH candidates based on the configured TCI state or associated CORESET pool index (i.e., an associated CORESETpoolIndex element indicated in a message from a network node) of a search space. In some solutions, a WTRU may assume that an individual PDCCH may be received only in a CORESET or search space associated with CORESETpoolIndex=0 (or 1). Alternatively, or additionally, a WTRU may assume that an individual PDCCH transmission may be received only in a CORESET or search space associated with a TCI that is Quasi-Co-Located (QCL-ed) with a specific RS, e.g., a Synchronization Signal Block (SSB).

If a WTRU does not have the capability for simultaneous multi-beam reception, a WTRU may assume that the overlapped PDCCHs, i.e., PDCCH1(2) and the individual PDCCH2 in case (a) of FIG. 6A are both transmitted from a same TRP, e.g., sharing a same TCI. Therefore, a same QCL Type D may be used for reception of both PDCCH transmissions. Alternatively, or additionally, in the same example, if a WTRU does not have capability for simultaneous multi-beam reception, a WTRU may use at least one of the following for determination of the QCL Type D parameters. For example, the WTRU may use the QCL Type D parameter of the PDCCH, i.e., PDCCH1(2) or the individual PDCCH2, that corresponds to the stronger link, e.g., highest RSRP; the QCL Type D parameter of the linked PDCCH, i.e., PDCCH1(2); the QCL Type D parameter of the individual PDCCH; or the QCL Type D of the PDCCH candidate with higher search space priority.

In some solutions, a WTRU with simultaneous multi-beam reception capability may also consider at least one the above conditions.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed:

1. A method performed by a Wireless Transmit/Receive Unit (WTRU), the method comprising:

receiving one or more first channel state information reference signals (CSI-RSs) from each of a first transmit/receive point (TRP) and a second TRP;

determining, based on the one or more received first CSI-RSs, first respective CSI quantities associated with each of the first TRP and the second TRP;

selecting, based on the first respective CSI quantities, one of the first TRP or the second TRP as a primary TRP and a remaining one of the first TRP or the second TRP as a secondary TRP;

reporting information indicating at least the first respective CSI quantity associated with the primary TRP, wherein the one or more second CSI-RSs received from the primary TRP are precoded based on at least the first respective reported CSI quantity associated with the primary TRP;

receiving one or more second CSI-RSs from the primary TRP;

determining, based on the one or more second CSI-RSs received from the primary TRP, a second CSI quantity and a first precoding matrix indicator (PMI) for the primary TRP;

determining a channel coding parameter associated with the precoded one or more second CSI-RSs received from the primary TRP and associated with the determined first PMI for the primary TRP;

receiving one or more third CSI-RSs from the secondary TRP;

determining, based on the one or more third CSI-RSs received from the secondary TRP, a second CSI quantity associated with the secondary TRP;

determining, based on the determined channel coding parameter associated with the one or more second CSI-RSs and associated with the second CSI quantity associated with the secondary TRP, a second PMI for the secondary TRP that reduces inter-layer interference between the primary TRP and the secondary TRP; and reporting information indicating the determined second PMI for the secondary TRP.

2. The method of claim 1 comprising calculating a null space associated with the precoded one or more second CSI-RSs received from the primary TRP, wherein the second PMI for the secondary TRP is determined based on the calculated null space associated with the precoded one or more second CSI-RSs received from the primary TRP.

3. The method of claim 1 further comprising receiving configuration information providing an indication of resources for receiving at least some of the first CSI-RSs, the second CSI-RSs, or the third CSI-RSs.

4. The method of claim 1, wherein the selection of at least the first TRP as the primary TRP is further based on a comparison of at least one of the first respective CSI quantities with a threshold.

5. The method of claim 1, wherein a transmission including the reported at least the first respective CSI quantity associated with the primary TRP is transmitted to the primary TRP.

6. The method of claim 1, wherein a transmission including the reported at least the first respective CSI quantity associated with the primary TRP includes information indicating a selection of the first TRP as the primary TRP.

7. The method of claim 1, wherein the determined information associated with the one or more second CSI-RSs and associated with the first PMI comprises channel coding information, and wherein the second PMI for the secondary TRP is determined based on the determined channel coding information to minimize inter-layer interference between signals transmitted by the first TRP and signals transmitted by the secondary TRP.

8. The method of claim 1, further comprising determining a plurality of PMIs for the primary TRP and a plurality of PMIs for the secondary TRP.

9. The method of claim 8, further comprising determining, from the respective pluralities of PMIs, a number of best PMIs for the primary TRP and a same number of best PMIs for the secondary TRP.

10. The method of claim 8, further comprising associating at least one of the plurality of PMIs for the primary TRP with at least one of the plurality of PMIs for the secondary TRP, and transmitting a report including information indicating the association of the at least one of the plurality of PMIs for the primary TRP with the at least one of the plurality of PMIs for the secondary TRP.

11. A wireless transmit/receive unit (WTRU) comprising:

a processor; and a transceiver;

the transceiver configured to receive one or more first channel state information reference signals (CSI-RSs) from each of a first transmit/receive point (TRP) and a second TRP;

the processor configured to determine, based on the one or more received first CSI-RSs, first respective CSI quantities associated with each of the first TRP and the second TRP;

the processor further configured to select, based on the first respective CSI quantities, one of the first TRP or the second TRP as a primary TRP and a remaining one of the first TRP or the second TRP as a secondary TRP;

the processor and the transceiver further configured to report information indicating at least the first respective CSI quantity associated with the primary TRP;

the transceiver further configured to receive one or more second CSI-RSs from the primary TRP, wherein the one or more second CSI-RSs received from the primary TRP are precoded based on at least the first respective reported CSI quantity associated with the primary TRP;

the processor further configured to determine, based on the one or more second CSI-RSs received from the primary TRP, a second CSI quantity and a first precoding matrix indicator (PMI) for the primary TRP;

the processor further configured to determine a channel coding parameter associated with the precoded one or more second CSI-RSs received from the primary TRP and associated with the determined first PMI for the primary TRP;

the transceiver further configured to receive one or more third CSI-RSs from the secondary TRP;

the processor further configured to determine, based on the one or more third CSI-RSs received from the secondary TRP, a second CSI quantity associated with the secondary TRP;

the processor further configured to determine, based on the determined channel coding parameter associated with the one or more second CSI-RSs and associated with the second CSI quantity associated with the secondary TRP, a second PMI for the secondary TRP that reduces inter-layer interference between the primary TRP and the secondary TRP; and the processor and the transceiver further configured to report information indicating the determined second PMI for the secondary TRP.

12. The WTRU of claim 11, calculate wherein the processor is further configured to calculate a null space associated with the precoded one or more second CSI-RSs received from the primary TRP wherein the second PMI for the secondary TRP is determined based on the calculated null space associated with the precoded one or more second CSI-RSs received from the primary TRP.

13. The WTRU of claim 11, wherein the transceiver is configured to receive configuration information providing an indication of resources for receiving at least some of the first CSI-RSs, the second CSI-RSs, or the third CSI-RSs.

14. The WTRU of claim 11, wherein the processor is further configured to select at least the first TRP as the primary TRP further based on a comparison of at least one of the first respective CSI quantities with a threshold.

15. The WTRU of claim 11, wherein the transceiver is further configured to transmit a transmission including the reported at least the first respective CSI quantity associated with the primary TRP is transmitted to the primary TRP.

16. The WTRU of claim 11, wherein a transmission including the reported at least the first respective CSI quantity associated with the primary TRP includes information indicating a selection of the first TRP as the primary TRP.

17. The WTRU of claim 11, wherein the determined information associated with the one or more second CSI-RSs and associated with the first PMI comprises channel coding parameters, and wherein the second PMI for the secondary TRP is determined based on the determined channel coding parameters to minimize inter-layer interference between signals transmitted by the first TRP and signals transmitted by the secondary TRP.

18. The WTRU of claim 11, wherein the processor is further configured to determine a plurality of PMIs for the primary TRP and a plurality of PMIs for the secondary TRP.

19. The WTRU of claim 18, wherein the processor is further configured to determine, from the respective pluralities of PMIs, a number of best PMIs for the primary TRP and a same number of best PMIs for the secondary TRP.

20. The WTRU of claim 18, wherein the processor is further configured to associate at least one of the plurality of PMIs for the primary TRP with at least one of the plurality of PMIs for the secondary TRP and wherein the processor and the transceiver are further configured to transmit a reporting including information indicating the association of the at least one of the plurality of PMIs for the primary TRP with the at least one of the plurality of PMIs for the secondary TRP.

* * * * *